May 6, 1958 G. P. MALY 2,833,982
WATER ENTRY DETECTION METHOD AND APPARATUS
Filed Jan. 14, 1957
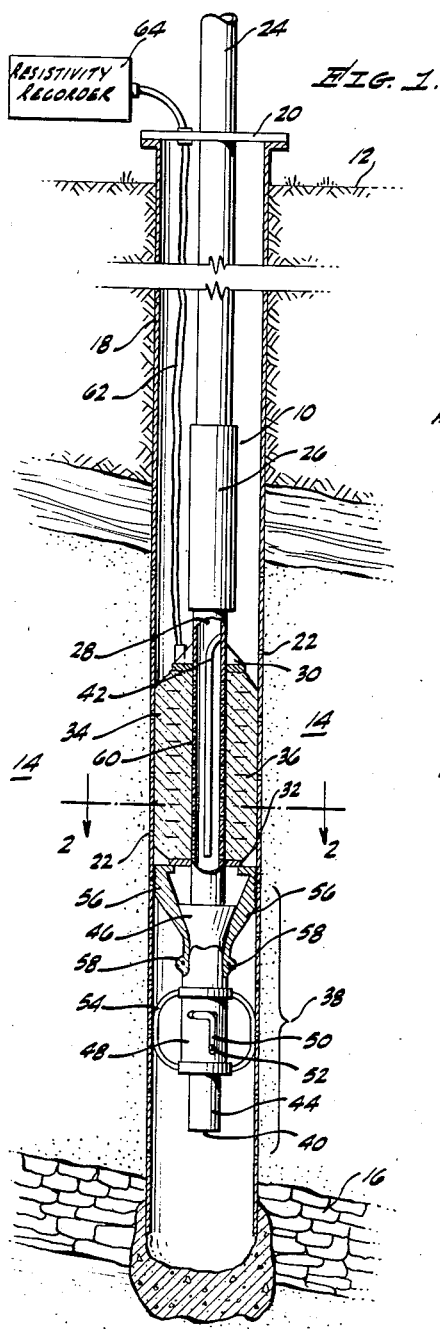
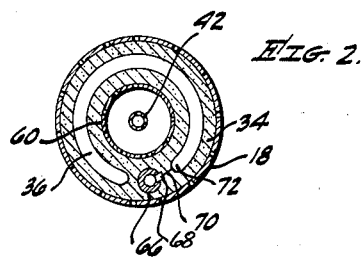
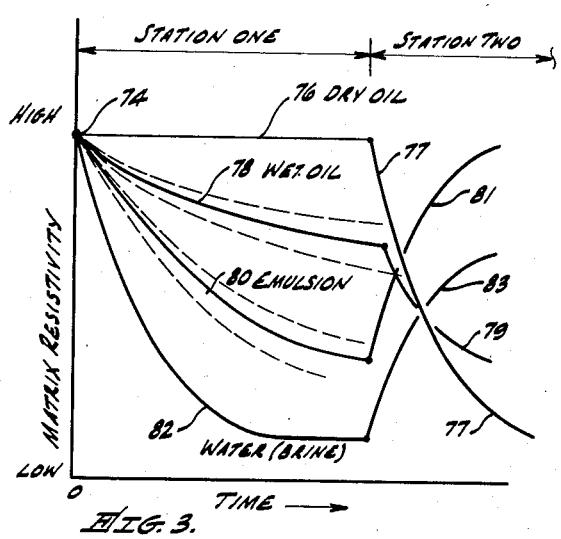
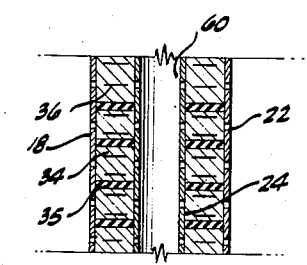
INVENTOR.
GEORGE P. MALY,
BY
ATTORNEY.

United States Patent Office 2,833,982
Patented May 6, 1958

2,833,982

WATER ENTRY DETECTION METHOD AND APPARATUS

George P. Maly, Fullerton, Calif., assignor to Union Oil Company of California, Los Angeles, Calif., a corporation of California Application January 14, 1957, Serial No. 634,018

14 Claims. (Cl. 324—2)

This invention relates to a well logging method and particularly to an instrument for determining the composition of fluids entering a well bore at various places along the permeable interval. Specifically the instrument detects the locations of entry of emulsions, wet oil, and water or brine.

Crude petroleum and other valuable fluids are frequently produced from the earth's subsurface through well bores in a condition wherein they are contaminated with other fluids which enter the bore simultaneously. This is especially true in the production of crude petroleum in which saline water or brine is produced with the oil. Since these fluids are ordinarily pumped from the subsurface through the bore, an extensive degree of water contamination inordinately increases the pumping costs. Sometimes the quantity of water so produced runs as high as nine times the volume of oil pumped from the ground. Occasionally the water cut is higher and such excessive quantities render oil production uneconomic.

It is important to determine this information accurately in order that appropriate selective plugging or other water shutoff measures may be taken so as to minimize the quantity of brine produced with crude petroleum.

The present invention therefore is directed to an improved method and apparatus for detecting accurately the points or depth increments through which water and other water-containing streams enter the bore from the surrounding formation.

It is a primary object of this invention to provide a method for determining the location and approximate composition of fluids entering a borehole as a function of depth.

It is a further object to accomplish this determination without abnormal interruption of normal production of fluids from the bore.

It is a further object to provide a method for logging thick or deep producing intervals to determine the points or strata of water introduction.

A particular object is to provide an improved method and apparatus for determining water entry locations without the interruption of normal production operations and which method and apparatus may be used to log water entry from fluid producing strata having thicknesses of up to 2000 feet or more.

It is also an object of this invention to provide a simple apparatus or instrument to be used in accomplishing the foregoing objects.

Other objects and advantages of the present invention will become apparent to those skilled in the art as the description and illustration thereof proceed.

Briefly the present invention comprises a method in which the foregoing objects are realized by disposing a fluid-permeable resilient material as a matrix concentrically around a perforated section of production tubing and which may be compressed slightly in order to force the matrix against a section of perforated casing or against the walls of fluid producing strata. The interior of the matrix is provided with a plurality of superimposed electrodes spaced apart from one another at a distance of between about 0.25 and about 6 inches and spaced apart from the production tubing and the outer surface of the matrix. One desirable form of electrode is that of a ring running substantially completely around the production tubing through the matrix. Running longitudinally through the matrix more or less parallel with the axis of the production tubing is provided an electrode cable conduit containing a plurality of electrical conductors, one each of which is connected to each electrode. This cable is extended to the surface through the annular space between the casing and the production conduit and is connected to suitable instruments located at the surface which are adapted to measure and record the resistivity or conductivity of the matrix with the fluids passing through between each adjacent pair of electrodes as an indication of the brine ingress location.

The logging operation according to this invention involves the disposition of the fluid-permeable matrix at a selected position within the well bore opposite the permeable interval to be logged. The pump may be disposed either above or below the permeable matrix and in either case is operated so as to cause the flow of fluids upwardly through the production tubing thereby drawing or permitting the fluids to flow from the fluid-producing strata into the annular space between the tubing and the casing from which they are picked up by the pump and carried to the surface. In the case of that part of the annular space occupied by the matrix, the permeable fluids flow radially therethrough between the electrodes and enter the production tubing through a special perforated section of tubing within the matrix. By compressing the matrix slightly, as by supporting part of the weight of the production tubing string through the matrix against the wall of the casing by means of a natural or artificial bottom, the matrix may be pressed against the perforated casing requiring the fluid to flow through the perforations in this part of the casing, then through the permeable matrix radially between the adjacent pairs of electrodes, and then into the production tubing.

The nature of the fluids so flowing between the electrodes, and particularly their water content, is readily detectable by measuring and recording the resistivity of the matrix through which the fluids are flowing between adjacent electrode pairs. To obtain a proper record, it is preferable to operate in either of the manners described below.

In one method of operation, the matrix is first saturated by flowing water through it, followed by a flow of dry oil which may be either kerosene or crude oil obtained from the well bore being logged. This brings the entire matrix to an equilibrium or reference condition, generally referred to as the "restored state" and in this state it has a reference resistivity.

The matrix thus treated is positioned opposite that permeable interval to be investigated with respect to water ingress into the well bore.

The well is placed on production causing the formation fluids to pass through the annular matrix into the production tubing and during this time a periodic or a continuous log is maintained recording the resistivity of the matrix between adjacent electrode pairs over the interval being investigated.

There is no substantial resistivity change when the fluid produced is substantially dry oil, and the change in resistivity is relatively slow when the fluid is merely wet oil, somewhat faster when the fluid is an oil and water emulsion, and it changes quite rapidly when water with substantially no oil passes between the electrodes. Continued flow causes the resistivity of the matrix to approach an equilibrium value which is characteristic of the fluid flowing between each pair of electrodes.

Before proceeding to investigate the adjacent or another producing interval, the restored state is again obtained by injecting crude oil in the reverse direction through the tubing and the matrix back into the formation previously investigated until the instruments indicate restored state resistivity between each adjacent electrode pairs.

The test section is then relocated in the well bore, the matrix compressed so as to press its outer surface against the fluid-producing surface, production is begun from this interval, and the new resistivity changes are again recorded.

These steps are repeated to log the desired interval.

The other method is identical to the one described immediately above except that the matrix may be pre-saturated with oil before entering the hole and the matrix is not returned to the "restored state" in each position or station. Instead, the changes in resistivity to or toward new equilibrium values are logged. This is the faster of the two methods and involves no interruption of fluid production from the borehole. Again the steps are repeated at each new position to log the entire interval where these are deeper than the matrix length.

In order to eliminate interference with the production, especially in thick producing intervals, the apparatus is preferably provided with means for flowing the fluids produced from strata above the test section or matrix into the production tubing inlet at which point it may be picked up by the pump and conveyed to the surface.

Suitable fluid-permeable resilient matrix materials include sponge rubber, sponge cellulose materials, other resilient sponge plastic materials, and the like. The material also should have a reasonably good dielectric strength. It is preferred that the permeability of the matrix material be relatively high, such as at least about ten times that of the strata, so as to minimize any decrease in production from the fluid-producing zone during the test.

The structure of the apparatus of this invention and the method in which it is used will be more clearly understood by reference to the accompanying drawing in which:

Figure 1 is a vertical elevation view in partial cross section of a casing borehole extending through a fluid-producing permeable stratum and showing the instrument of this invention, Figure 2 is a transverse cross section of the instrument and the well casing taken in the direction indicated in Figure 1, Figure 3 is a graphical representation of typical data obtained through the use of the instrument shown in Figure 1, and Figure 4 is an elevation view in cross section of a modified form of the apparatus of Figure 1.

Referring now more particularly to Figure 1, a borehole 10 is shown extending from the earth's surface 12 downwardly through permeable stratum or strata 14 and terminating in an impermeable basement formation 16. The borehole is provided with casing 18, well head 20, and that portion of the casing which extends through the permeable interval is provided with openings 22 through which the fluids flow readily into the borehole.

Extending substantially coaxially through casing 18 is production tubing 24 which may be provided with pump 26. The instrument of the present invention is disposed below pump 26 or in any event near the lower end of the production tubing 24. The instrument comprises as its essential elements a perforated cylindrical conduit 28 disposed substantially at the axis of the borehole, upper stationary stop 30, lower movable stop 32, the resilient fluid-permeable matrix 34 provided with the plurality of annular shaped electrodes 36 superimposed one above the other and ordinarily insulated from each other in matrix 34, and false bottom or production tubing anchor 38. The lowest extremity 40 of the production tubing is open so that formation fluids flowing into the borehole below the instrument of this invention may flow upwardly into the pump inlet or into the production tubing. Also provided through the wall of the production tubing is upper inlet conduit 42 which in an analogous fashion provides an entry into the production tubing for formation fluids flowing into the borehole from that portion of the stratum above the instrument of this invention.

The false bottom or production tubing anchor 38 is provided with a central inlet tubing portion 44 which in turn is provided with a conical section 46. Surrounding this cylindrical portion is a cylindrical jacket 48 provided with J slot 50 into which is received boss or projection 52 which extends from the outer surface of lower cylindrical inlet section 44. Also provided around the outer surface of jacket 48 is a plurality of spring steel friction bars 54. These press against the inner surface of casing 18 with sufficient force to support the weight of jacket 48 and its associated apparatus elements, including the toothed anchor elements 56 which are hinged at the upper end of jacket 48 by pivots 58.

As the instrument is lowered through the borehole into the position of first use, the inlet conduit projection 52 is in the position at the top and to the left of J slot 50. In this position cylindrical element 44 is raised with respect to jacket 48, conical element 46 is also raised so that its upper position is at a level corresponding to the top of anchor elements 56. This prevents the anchor elements from engaging with the inner surface of the casing and permits the instrument to be freely moved through the bore. This also increases the distance between upper and lower stops 30 and 32, decompresses the resilient fluid-permeable matrix 34, and permits this material to move freely through the bore.

The instrument may be made sufficiently long between stops 30 and 32 so that the fluid-permeable matrix may extend entirely from the top to the bottom of a production interval. Ordinarily with thick strata the instrument is moved from station to station through the permeable interval to obtain complete data regarding the composition of fluids entering the bore at all points along this interval. In Figure 1 the fluid-permeable matrix is shown considerably shorter in length than the depth of permeable stratum 14.

In beginning the logging of such a thick stratum, the instrument is moved to a position at the top or at the bottom of the interval. The production tubing is then turned counterclockwise causing projection 52 to move to the right in J slot 50. While the friction bars 54 support the weight of anchor elements 56 and jacket 48 the entire tubing string is lowered moving projection 52 through the vertical portion of J slot 50, and this causes conical element 46 to engage anchor elements 56 with the inner surface of the borehole casing. This downward movement simultaneously compresses the resilient fluid-permeable matrix and presses its exterior surface uniformly against the casing wall, or formation walls if the strata are uncased. Of course, other tubing anchors may be used instead of the typical one shown in Figure 1.

The normal fluid flow from each stratum in the interval encompassed by the vertical height of the fluid-permeable matrix continues without interruption through the casing perforations, through the fluid-permeable matrix between the superimposed electrodes, and enters the production tubing through perforations 60 provided therein. Fluids produced from the permeable formation above and below the interval encompassed by the matrix enter the production tubing through upper inlet conduit 42 and lower opening 40 into lower inlet conduit 44 in the manner referred to above.

Each of the individual electrodes is attached to a separate conductor contained in conductor cable 62 and is thereby connected to resistivity recorder 64 located at the surface.

With the fluid-permeable matrix initially in what is known as the restored state as defined above, the flow of fluids through the permeable matrix causes a deviation in resistivity of the matrix from that determined at the beginning of the run and corresponding to the restored state. Normal production is allowed to continue for a period sufficient to obtain either a clear indication of the rate of change of resistivity of the matrix increments between each pair of electrodes, or a clear indication of a new equilibrium resistivity. This will be discussed further in connection with Figure 3. This provides data from which the composition of fluids entering the borehole between these electrodes may be determined.

At the end of a given run with the instrument in a single position, crude petroleum may be returned to the foramtion in the reverse direction through the permeable matrix to return it to its restored state. This step may be omitted if desired as indicated previously. The production tubing is then lifted and turned clockwise to release the tubing anchor, the instrument is moved to a new location and reset, and another run is made during which additional resistivity change measurements are made. This procedure is continued until the entire permeable interval has been logged.

Referring now more particularly to Figure 2, a transverse section of the instrument shown in Figure 1 indicates perforated casing 18, the resilient fluid-permeable matrix, one of the annular electrodes 36, the perforated production tubing section 60, and the upper inlet conduit 42. Shown more clearly in Figure 2 is conductor conduit 66 extending vertically through matrix 34. At a point opposite the end of each electrode 36 an insulating means 68 is provided in the wall of the cable conduit. Conductor 70 extends from conduit 66 through the insulating means 68 and provides an electrical connection at point 72 with each of the electrodes 36.

Referring now more particularly to Figure 3, a graphical representation of typical data taken with the instrument of this invention during the runs at the first two stations is given. In this chart the measured matrix resistivity between individual electrodes is plotted against the duration of each run. Point 74 indicates the high resistivity of the matrix in the restored state after passage therethrough of dry oil. As indicated by curve 76 this resistivity remains substantially constant when dry oil is produced through the electrodes from a given part of the formation at station one. Curve 77 indicates the resisitivity change when water is passed through the matrix in station two. Curve 78 indicates the relatively gradual decrease of the measured resistivity toward an equilibrium value when wet oil is produced from the formation. Such wet oil may contain up to about 20% by volume of water. The broken lines on either side of curve 78, and of curve 80 subsequently described, indicate the approximate limits of the resistivity variation with water content for the particular material. Curve 79 indicates the subsequent change at station two when emulsion is produced through the matrix. Curve 80 indicates the more rapid resistivity decrease when a water and oil emulsion is being produced from the formation at station one, and curve 81 indicates the subsequent change when dry oil is produced at station two. Curve 82 shows the extremely rapid resistivity decrease which occurs when water or brine is being produced at station one, and curve 83 shows the subsequent change toward a new equilibrium value with flow of dry oil at station two. The method used at station two is the second mentioned above. If the first method is used the data all follow the curves shown in Figure 3 for station one.

It is seen from Figure 3 that the detected change in resistivity with time indicates quite clearly the composition or nature of fluids being produced from a small increment of the formation which is immediately opposite a given pair of electrodes. In this way a stratum producing dry oil is readily distinguishable from one producing wet oil, and from one producing an emulsion, and from one producing brine. Likewise, these may be distinguished from one another and appropriate remedial measures may be taken as are necessary in any given situation. The most common situation of course is the detection of brine entry and the shut-off of these formations producing brine.

Referring finally to Figure 4, a fragmentary view of a modified permeable matrix 34 is shown including a plurality of superimposed, spaced-apart, impermeable annular flow directors of resilient material. These positively prevent vertical flow through the permeable matrix. Any resilient material which is stable in the environment may be used, such as rubber, synthetic rubber like neoprene, and resilient resins.

Electrical properties of the matrix, other than the resistivity, may be measured in modifying the method of this invention. Such other properties include the magnetic permeability, the dielectric constant, the power factor, the capacitance, the impedance, and others. Of course, direct current or alternating current voltages are applied to the electrodes as appropriate to measurement of the particular property selected. With crude petroleum and brine, probably the resistivity most readily distinguishes the various fluids involved from each other.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for logging a fluid-producing permeable interval penetrated by a borehole which comprises disposing a fluid-permeable matrix enclosing a plurality of superimposed spaced-apart electrodes in said borehole at a known depth opposite said interval and surrounding a perforated section of production tubing, said matrix being intially saturated with a known fluid giving said matrix between pairs of electrodes a known electrical property, removing fluid from said borehole through the production tubing thereby permitting flow of fluids thereinto from said permeable interval through said matrix, and measuring said electrical property of said matrix between said pairs of electrodes to determine the nature of fluid flowing therebetween into said borehole.

2. A method according to claim 1 wherein said electrical property is the resistivity of the fluid-containing matrix.

3. A method according to claim 1 in combination with the steps of moving said matrix from station to station in said borehole throughout said permeable interval at known depths and repeating the measurement of the electrical property at each station.

4. A method according to claim 3 in combination with the step of resaturating said matrix with said known fluid at each station after measuring said electrical property at said station and before moving to the next station.

5. A method according to claim 1 wherein said fluid-producing interval produces crude pretroleum, said known fluid comprises a substantially dry hydrocarbon oil, said electrical property is the resistivity of said matrix, and wherein said resistivity remains substantially constant after treatment with said dry hydrocarbon oil when dry petroleum flows through said matrix, said resistivity decreases to a lower value when wet petroleum flows therethrough, said resistivity decreases to a still lower value when emulsion flows therethrough, and said resistivity decreases to the lowest value when water flows therethrough.

6. An apparatus for logging a fluid-producing permeable interval penetrated by a borehole which comprises an elongated production tubing extending from the earth's surface downwardly through said borehole to said permeable interval, a production tubing anchor disposed adjacent the lower end of said tubing and operable from the surface, said production tubing being provided with an elongated perforated section adjacent said anchor, a fluid-permeable resilient matrix of annular-shaped cross section surrounding said perforated section, a plurality of superimposed spaced-apart electrodes disposed in the interior of said matrix, means above and below said matrix adapted to compress it and thus press the outer surface of said matrix against the surrounding surface through which fluids enter said borehole from said interval whereby said fluids flow from said surface through said matrix between said electrodes into said production tubing, an electrical cable containing a plurality of conductors, one connected to each of said electrodes, extending through said borehole to the surface, and means located at the surface and connected to said cable adapted to measure an electrical property of said matrix between electrodes.

7. An apparatus according to claim 6 in combination with a reciprocating pump disposed above and in fluid-receiving relation to the perforated section of said production tubing.

8. An apparatus according to claim 6 wherein each of said electrodes comprises a ring embedded within said matrix and extends substantially entirely around said perforated section of production tubing.

9. An apparatus according to claim 6 wherein the fluid permeability of said matrix is high relative to that of the permeable interval so as to exert substantially no flow restriction on the fluids flowing therethrough.

10. An apparatus according to claim 9 wherein the permeability of said matrix is at least about ten times greater than that of said interval.

11. An apparatus according to claim 6 wherein said electrodes are spaced vertically apart from each other by a distance of between about 0.25 and about 6.0 inches.

12. An apparatus according to claim 6 wherein the lower end of said production tubing is open to receive fluids produced from that part of the permeable interval below said matrix, and said production tubing is further provided with an upper inlet opening to receive fluids produced from that part of the permeable interval above said matrix.

13. An apparatus according to claim 6 in combination with a plurality of resilient nonpermeable annular-shaped fluid flow directors disposed between said electrodes to prevent fluid flow vertically within said matrix.

14. An apparatus according to claim 6 wherein said means adapted to compress said matrix comprises an upper stationary stop of annular shape disposed around and secured to said production tubing and a lower movable stop of annular shape disposed around said production tubing and slidably supported on said tubing anchor.

References Cited in the file of this patent
UNITED STATES PATENTS 2,539,355    Reichertz _____ Jan. 23, 1951